United States Patent [19]

Akatsuka

[11] 4,435,431

[45] Mar. 6, 1984

[54] ELIMINATION OF RANCID ODOR IN FERMENTED MILK PRODUCTS

[75] Inventor: Shin-ichiro Akatsuka, Saitama, Japan

[73] Assignee: Eisai Company, Limited, Tokyo, Japan

[21] Appl. No.: 352,871

[22] Filed: Feb. 26, 1982

[30] Foreign Application Priority Data

Mar. 6, 1981 [JP] Japan .................................. 56-31204

[51] Int. Cl.³ .......................... A23C 9/12; A23C 19/00
[52] U.S. Cl. ......................................... 426/36; 426/34; 426/40; 426/43; 426/330.2; 426/334
[58] Field of Search ....................... 426/30, 36, 37, 40, 426/62, 330.2, 334, 34, 42, 43

[56] References Cited

U.S. PATENT DOCUMENTS 2,817,590 12/1957 Traisman et al. ...................... 426/62
2,928,740  3/1960 Rosenthal et al. .................... 426/62
2,946,688  7/1960 Rosenthal et al. .................... 426/62

*Primary Examiner*—David M. Naff
*Assistant Examiner*—Marianne S. Minnick
*Attorney, Agent, or Firm*—Wenderoth, Lind & Ponack

[57] ABSTRACT

A yeast decomposed product or a mixture of a yeast decomposed product and an albumen decomposed product is added to a fermented milk product such as cheese or yogurt to prevent fermentative rancid odor, maintain texture and enhance flavor.

4 Claims, No Drawings

ELIMINATION OF RANCID ODOR IN FERMENTED MILK PRODUCTS

BACKGROUND OF THE INVENTION

This invention relates to a process for producing fermented milk products.

In the field of fermented milk products, there has not as yet been given any satisfactory solution to the problem of the rancid odor due to fermentation.

Although the cause for the generation of the fermentative rancid odor has not yet been fully understood, it seems unquestionable that the nature of such rancid odor is a strong odor of volatile lower fatty acids, such as butyric acid, generated by lactic acid bacteria during the fermentation step. However, in any case, since the rancid odor remarkably deteriorates the flavor of the fermented milk products and exhibits an uncomfortable taste, its prevention has been a long-pending problem in this field.

Under such circumstances, I have been continuously studying in pursuit of a means to eliminate the fermentative rancid odor in fermented milk products and enhance the mild flavor inherent in the fermented milk products. As a result, I have discovered that when adding a yeast decomposed product or a mixture of a yeast decomposed product and an albumen decomposed product in an appropriate stage during the production step of a fermented milk product, the rancid odor is surprisingly eliminated and the mild flavor inherent in the fermented milk product is enhanced, and thus have accomplished this invention.

SUMMARY OF THE INVENTION

Accordingly, this invention resides in a process for producing fermented milk products, which comprises adding a yeast decomposed product or a mixture of a yeast decomposed product and an albumen decomposed product, to a fermented milk product.

DETAILED DESCRIPTION OF THE INVENTION

The fermented milk products as used in this invention are cheese and fermented milk, particularly yoghurt. Further, fermented butter is also included. As for the cheese, this invention is effective on both natural cheese and process cheese.

The natural cheese may encompass a great variety of cheeses depending on the starting material, the method of coagulation, the method for maturing, etc., and although somewhat different from kind to kind, any of these methods inevitably generates a rancid odor after maturing. However, when this invention is practiced, for example, as demonstrated in the Examples on the effects hereinbelow described, it presents an improvement or an elimination of the rancid odor and flavor enhancement of the dairy product, which has led to a general evaluation of these products as being mild and delicious, when treated according to the present invention. A similar evaluation has also been obtained with process cheese.

In the case of yoghurt, it has also a disadvantage, in addition to the partial generation of a rancid odor, that the acidic taste is intensified due to the progress of the lactic acid fermentation during storage and the separation of whey becomes more conspicuous, that is, cream-separation is observed. This disadvantage remarkably affects the texture, which is an important factor for the flavor of yoghurt. However, when this invention is practiced for example, as demonstrated in the Example on the effects hereinbelow described, the cream-separation is prevented and the flavor inherent to yoghurt is successfully maintained.

The yeast decomposed product according to this invention as herein used means that obtained by decomposing the cellular walls of brewer's yeast and a different yeast other than brewer's yeast, such as baker's yeast, sake wine yeast, soy sauce yeast, wine yeast etc., by chemical, physical or biological treatments. As a commercial product, a yeast autolysate, i.e., a yeast extract, is available.

As the albumen decomposed product, there may be employed either the product obtained by acid hydrolysis or the product obtained by enzymatic hydrolysis.

As the mixture of the yeast decomposed product and the albumen decomposed product, it is possible to obtain a commercial product generally available under the trade name "Fretas A" and use it in this invention.

The Fretas A contains as main components peptides and amino acid groups obtained by the controlled hydrolysis of albumen, and comprises 50% of a mixture of the above and a yeast extract derived from brewer's yeast, and further 50% of processed starch. The following shows the analytical values of its components:

| Components | Composite ratio (by weight) |
|---|---|
| Carbohydrates | 76.5% |
| Water | 6.3% |
| Crude proteins | 6.1% |
| Crude fats | 0.3% |
| Reducing sugars | 2.1% |
| Sodium chloride | 8.7% |

Since the product is derived from a natural source, the analytical values somewhat fluctuates, but they are adjusted so as not to deteriorate the features of the product.

The amount of the yeast decomposed product or the mixture of the yeast decomposed product and the albumen decomposed product to be added in this invention somewhat varies, depending on the kind of the fermented milk product, but in any case 0.05–0.5%, based on the finished product, is a preferred range. However, this range is not limitative in this invention.

The method for addition may be, in the case of cheese production, satisfactorily effected with stirring at an appropriate time after completion of the fermentation step. In general, it is conveniently added directly in the stirring stage for homogenizing, just prior to bottling or hot packing of the finished product.

For instance, in the case of the production of cream cheese, which is one kind of natural cheese, a starter is added to raw milk and fresh cream to ferment and mature it, then cutting, heating and whey separation are effected, and thereafter when emulsification is conducted by adding an emulsifier, the additive (that is, the yeast decomposed product or the mixture of the yeast decomposed product and the albumen decomposed product) may be added together with the emulsifier and stirred. In the case of the production of process cheese, several kinds of natural cheese are admixed, followed by heat-melting, and when adding an emulsifier, flavoring agents, etc., this additive (that is, the yeast decomposed product of the mixture of the yeast decomposed product and the albumen decomposed product) may be added together with the same.

For the production of yoghurt, defatted milk, sucrose, a stabilizer etc. are added to water, the whole is sterilized by heating, and further when a lactic acid bacterium is added thereto and stirred, this additive (that is, the yeast decomposed product or the mixture of the yeast decomposed product and the albumen decomposed product) may be added following the lactic acid bacterium and stirred.

Since this invention is characterized by the addition of the yeast decomposed product or the mixture of the yeast decomposed product and the albumen decomposed product according to this invention, the above-described modes of addition are merely illustrative, and are not restricted thereto.

The effect of this invention will be illustrated by the following Examples on the Effect, wherein percent (%) is meant for by weight.

Example on the Effect 1

Samples

There were used, as samples, three kinds of cream cheese, i.e., A (not added), B (0.1% added) and C (0.2% added), produced respectively by procedures similar to those described in Example 1 except that 0.15% of Fretas A in the description of Example 1 was replaced by 0%, 0.1% and 0.2% of Fretas A, respectively.

Method

A panel for testing consisting of 10 males and 10 females was chosen. They were made to smell yoghurt to recognize its odor characteristics of the fermentative rancid odor, and thereafter given 2 g of each sample. The test was conducted as follows:

(1) Firstly, the ranking test was conducted by the Kramer method.

(2) Next, using the same panel for testing, the triangle test was carried out. In the triangle test, the sequence effect was offset first, and the test was then made using two-digit random numbers.

(3) The organoleptic or liking properties were comprehensively tested by questionnairing.

Results (1) Rank Decision by Kramer Method

The score of each samples was as follows:

| Sample | A | B | C |
|--------|---|---|---|
| Score  | 45 | 30 | 45 |

Results of The Test
n (number of panel members)=20,
k (number of samples)=3,
where the risk factor is 5% ($\alpha=0.05$), a=32,
where the risk factor is 1% ($\alpha=0.01$), c=32, and from the above table, min R=$R_B$=30.
Therefore, $R_B < a (\alpha=0.05)$ $R_B < c (\alpha=0.01)$ That is, a significant difference was found among the three samples A, B, and C, and in particular, B was palatable and favorably accepted.

(2) Organoleptic or liking Evaluation by the Triangle Test

The present selection was 70%. That is, at a risk factor 5%, there was confirmed a significant difference between the non-addition group and the addition group. Further, among the 70% samples, which showed a significant difference, those evaluated as having a good taste were 50%, thus presenting an appropriate judgement.

In addition, those judged that there was an improvement on the fermentative rancid odor was 50%. Therefore, it is judged that the addition of Fretas A has enhanced the organoleptic or taste properties and improved the fermentative rancid odor.

(3) As for the organoleptic or taste properties (i.e. those that liked the taste), the following replies were obtained.

On Sample A, the following evaluation was obtained. The acid taste is strong—40%; it has a salty taste, characteristic smell, bad melt in the mouth, spoiled offensive odor, and bad odor.

On Sample B, it was found that the organoleptic or liking properties were quite high with the following comprehensive evaluation:

Texture: Mild, good melt in the mouth.
Acid taste: Moderate.
Deliciousness: Delicious taste and feels somewhat sweet.
Flavor: Strongly milky flavor, fresh butter-like flavor, without rancid odor.

On Sample C, the evaluation was as follows:

Texture: Smooth tongue feel—60%.
Acid taste: Plain taste.
Deliciousness: Soft, acceptable taste.
Flavor: No smell, butter-like flavor.

Comprehensively, those who had judged B delicious were 11, those for C were 5 and those for A were 4, respectively.

Example on the Effect 2

Samples

There were used, as samples, two kinds of process cheese, A (not added) and B (0.3% added), produced respectively by procedures similar to those described in Example 3 except that 0.5% of Fretas A in the description of Example 3 was replaced by 0% and 0.3% of Fretas A respectively.

Method

A panel consisting of 12 each of both sexes was chosen, and given each sample in the form of a 1.5 cm cube. The method for testing was to make them recognize the organoleptic or liking properties of Samples A and B respectively and thereafter characterize the respective samples.

Results

Those who had given favorable scores to B were 16, and those for A were 8.

On the organoleptic or liking properties, the following replies were obtained:

On Sample A:
the taste is mild, and smoothness when melted in the mouth is somewhat poor:
slight roughness is felt on the tongue;
softness is comparable to that of Sample B;
saltiness is slightly superior, but the quality is a little poorer,
a vague greasy taste is felt; and since a salty taste appears, there is no balance in deliciousness,
and as a whole, this was not entirely satisfactory and a little too salty.

On Sample B, the evaluation was:
well melted in the mouth, and smooth on the tongue;
highly delicious, tasteful and refined;
tasty and the flavor is strong;
palatability and after-taste are spread and delicious,
the soft and mild salty taste is agreeable;
and even there was one who expressed it most delicious, and as a whole, especially the deliciousness and softness were stressed.

Example on the Effect 3

Samples

There were used, as samples, three kinds of yoghurt, A (not added), B (0.1% added) and C (0.2% added), produced respectively by procedures similar to those described in Example 5 except that 0.15% of Fretas A in the description of Example 5 was replaced by 0%, 0.1% and 0.2% of Fretas A respectively.

Method

The container was laid on its side and allowed to stand at 5° C. and at normal temperature for 2.5 hours respectively and the acidity (% as lactic acid), the pH and the amount (ml) of water due to cream-separation were measured.

Results

The results are given in the following table.

| Item | Sample | | |
|---|---|---|---|
| | A | B | C |
| Acidity | 0.98 | 0.84 | 0.91 |
| pH | 4.49 | 4.72 | 4.60 |
| Amount of water Separated | | | |
| Normal Temp. | 1.2 | 0.3 | 0.1 |
| 5° C. | 0.2 | 0 | 0 |

As evident from the table, the addition of Fretas A prevented the syneresis and therefore the texture, which is an important factor for the yoghurt flavor, was successfully maintained in the original state.

This invention will be more particularly described in the following Examples, but not restricted to these Examples wherein all percent (%) is meant for by weight.

EXAMPLE 1

One kg of raw milk and 0.5 kg of fresh cream were mixed to make a mixed starting material, a starter (*Streptococcus lactis* and *Streptococcus cremoris*) was added in an amount of 2% based on the mixed starting material, and it was fermented and matured at 22°–23° C. for 12 hours, so that the acidity reached 0.8–0.9%. The intermediate product was cut, and then heated at 55° C., after which the whey was separated, 0.15% of Fretas A was added along with an emulsifier of sorbitan fatty acid ester, 0.1% of gum tragacanth and 0.1% of monoglyceride, and the whole was stirred, and heated to 80° C., followed by hot packing and subsequent cooling. This product was free from the fermentative rancid odor.

EXAMPLE 2

Procedures similar to those described in Example 1 were conducted except that 0.15% of Fretas A in the description of Example 1 was replaced by 0.3% of Fretas A. The obtained product was free from the fermentative rancid odor, and was imparted with deliciousness, thus enhancing the organoleptic or liking properties.

EXAMPLE 3

0.7 kg of Cheddar cheese and 0.3 kg of cream cheese were mixed and ground, melted by heating to 80° C. for 5 minutes, and to this mixed cheese was added 0.5% of Fretas A along with 1% of monoglyceride, 0.1% of spices, 2% of citric acid and 5% of water, after which the mixture was stirred at 80° C. for 10 minutes, followed by packing 200 g each into containers and subsequent cooling at 2°–5° C. This product was free from the fermentative rancid odor, and had improved deliciousness, thus enhancing the organoleptic or liking properties.

EXAMPLE 4

Procedures similar to those described in Example 3 were conducted except that 0.5% of Fretas A in the description of Example 3 was replaced by 0.05% of Fretas A. The obtained product was free from the fermentative rancid odor.

EXAMPLE 5

110 g of defatted milk, 110 g of sucrose (granulated sugar), 5 g of gelatin and 3 g of agar were dissolved in 750 g of water, sterilized at 90° C. for 30 minutes, and rapidly cooled to 40° C. To this was added 25 g of a starter (*Lactobacillus bulgaricus*), and the mixture was stirred, after which 1 g of a flavoring agent (lemon) was added, followed by 0.15% of the total amount of Fretas A, and stirred well before bottling 120 ml each into containers. Then, the fermentation was effected in a 37° C. constant temperature chamber for 7.5 hours, and when the acidity reached 0.7%, the fermentation was terminated, and chilled to 5° C. or below. The obtained product was free from the fermentative rancid odor, and when the bottle was laid on its side and allowed to stand at 5° C. for 2.5 hours, there was no cream-separation observed.

What is claimed is:

1. A process for preventing fermented milk products from becoming rancid, which comprises adding an effective amount of a mixture of a yeast decomposed product and an albumen decomposed product to a fermented milk product, wherein the decomposed yeast and albumin are each present in the mixture in amounts sufficient to substantially eliminate the rancid odor ordinarily generated in said fermented product.

2. The process according to claim 1 in which the fermented milk product is cheese.

3. The process according to claim 1 in which the fermented milk product is yoghurt.

4. The process according to claim 1, 2 or 3 in which the amount of the mixture of the yeast decomposed product and the albumen decomposed product added to the fermented milk product is 0.05–0.5% by weight on the basis of the finished product.

* * * * *